Jan. 3, 1928.
W. F. STIMPSON
SCALE
Filed July 28, 1924
1,654,620
2 Sheets-Sheet 2
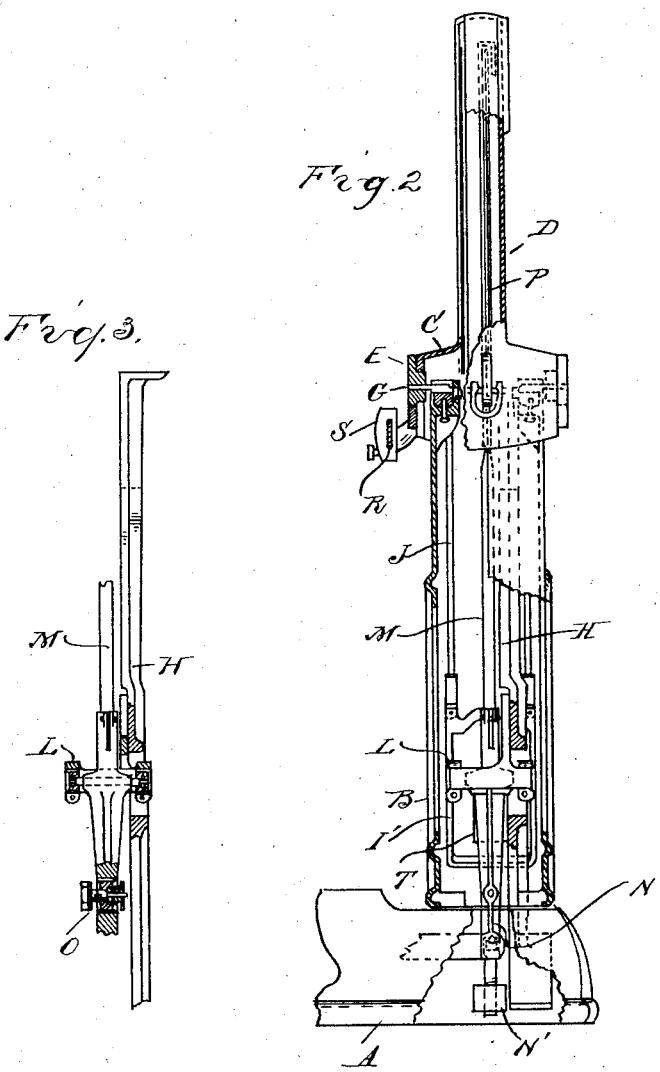
Inventor
Walter F. Stimpson Patented Jan. 3, 1928.

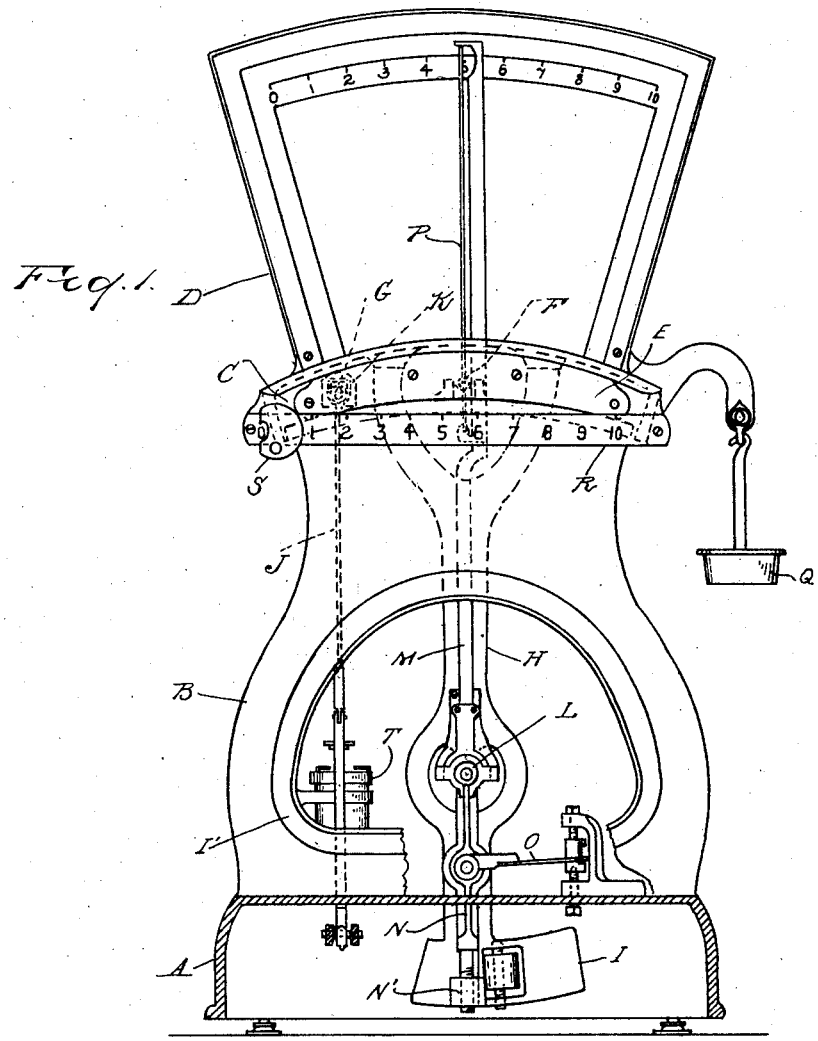

1,654,620

UNITED STATES PATENT OFFICE.

WALTER F. STIMPSON, OF LOUISVILLE, KENTUCKY.

SCALE.

Application filed July 28, 1924. Serial No. 728,667.

The invention relates to scales of the automatic pendulum type and more particularly to the so-called counter scales. The invention consists in the peculiar construction of the pendulum and indicating mechanism and in various other features as more fully hereinafter set forth.

In the drawings:

Figure 1 is a front elevation of the scale showing the indicator and other parts of the operating mechanism in position of half capacity load;

Figure 2 is a sectional side elevation;

Figure 3 is a section through the bearings for the indicator.

A is the base containing any suitable construction of platform supporting levers (not shown). B is a hollow pedestal rising from one end of the base and C is a beam fashioned to form a cap for the pedestal and carrying the upwardly extending chart housing D. The beam C is formed with parallel front and rear wall portions which overlap the front and rear walls of the pedestal and which are preferably provided with detachable plates E carrying inwardly projecting knife edge pivots F and G respectively for the fulcrum and steelyard rod connection. H is a pendulum arm depending from the beam C carrying at its lower end the pendulum weight I and being so proportioned as to counterbalance the chart housing and also to furnish the additional variable weighing force. I' is a steelyard rod extending upward from the platform supporting levers. The upper portion of this rod is bifurcated and has pivotally connected thereto the spaced extension rods J and J', which at their upper ends are provided with bearings K for engaging the pivots G.

The lower portion of the pendulum arm H is provided with bearings L for a pivotal index arm M. The latter is provided with a depending portion N having the adjustable weight N' thereon and intermediate this weight and the pivot a connection to a check rod O. This check rod may be of any suitable construction anchored in any suitable manner to the pedestal or frame so as to permit the free oscillation of the pendulum arm H and to cause a corresponding reverse oscillation of the index arm M. The arm M extends upward within the chart housing, being slightly offset and provided with the wire P, which forms the indicator line for reading the chart.

The beam C has attached to its free end the counterpoise Q and it is also provided with a tare beam R on its front side having the adjustable points S. A dash pot T is connected with the steelyard rod to retard and control its oscillation.

With the construction as described, in operation, the scale when unloaded will have the indicator P at the left of the chart in registration with the zero marking. When an article to be weighed is placed on the platform, the pull of the steelyard rod I' will rock the beam C, chart housing and pendulum arm H until balance is attained and through the operation of the check rod O, the indicator M will be swung in the reverse direction upon its pivot bearings L. Thus within the capacity of the scale, the position automatically assumed by the index arm will indicate both the weight and price computations. For greater capacity additional weights may be placed on the counterpoise in the usual manner.

One important advantage of the construction is that the entire height of the hollow pedestal may be utilized for the pendulum arm. Another equally important advantage is the reduction in angularity of the chart which lessens the difference between indications on the lower and upper portions thereof. This reduction in angularity is due to the fact that the index arm is pivoted at a comparatively low point on the pendulum arm so that a considerable portion of its weight is between the pivot and the lower edge of the chart. Another advantage is that the long lever arm which is formed by placing a pendulant weight in the base reduces the size of this weight.

What I claim as my invention is:

1. In a scale, the combination with a base, of a pedestal rising therefrom, a beam fulcrumed upon the upper end of said pedestal, a fan-shaped chart carried by said beam and projecting upward therefrom, a pendulum weight depending from said beam, an index pivotally mounted on the lower portion of said pendulum weight approximately at the apex of said fan-shaped chart and extending upward into proximity to said chart, and means actuated by the swinging of said pendulum for correspondingly swinging said index in relation to said chart.

2. In a scale, the combination with a base, of a pedestal rising therefrom, a beam fulcrumed on said pedestal, a fan-shaped chart carried by said beam and extending upward therefrom, a pendulum weight depending from said beam and extending into said base, an index pivotally mounted on the lower portion of said pendulum weight approximately at the apex of said fan-shaped chart, and means actuated by the swinging of the pendulum for correspondingly moving said index in relation to said chart.

3. In a scale, the combination with a base, a pedestal rising therefrom, a beam fulcrumed on said pedestal, a fan-shaped chart carried by said beam, a pendulum weight depending from said beam and extending into proximity to the lower end of said base, and an index pivotally mounted on said pendulum arm approximately at the apex of said fan-shaped chart extending upward into operative relation to said chart.

4. In a scale, the combination with a base, a hollow pedestal rising therefrom, a bifurcated beam pivotally mounted on said pedestal and forming a cap therefor, a chart housing extending upward from said beam, a pendulum weight arm extending downward from said beam within said housing and into proximity to the base thereof, and an index pivotally secured to the lower portion of said pendulum arm extending upward through said beam and within said chart housing.

5. In a scale, the combination with a base, of a pedestal rising therefrom, a beam fulcrumed on the upper end of said pedestal, a pendulum weight arm depending from said beam into proximity to said base, an index pivoted to said pendulum weight arm and at a relatively low point therein, extending upward above said beam, and a chart of relatively limited angularity having its apex approximately at the pivot of said index cooperating therewith.

In testimony whereof I affix my signature.

WALTER F. STIMPSON.